GUSTAV M. LE RUD, OF ARGUSVILLE, NORTH DAKOTA.

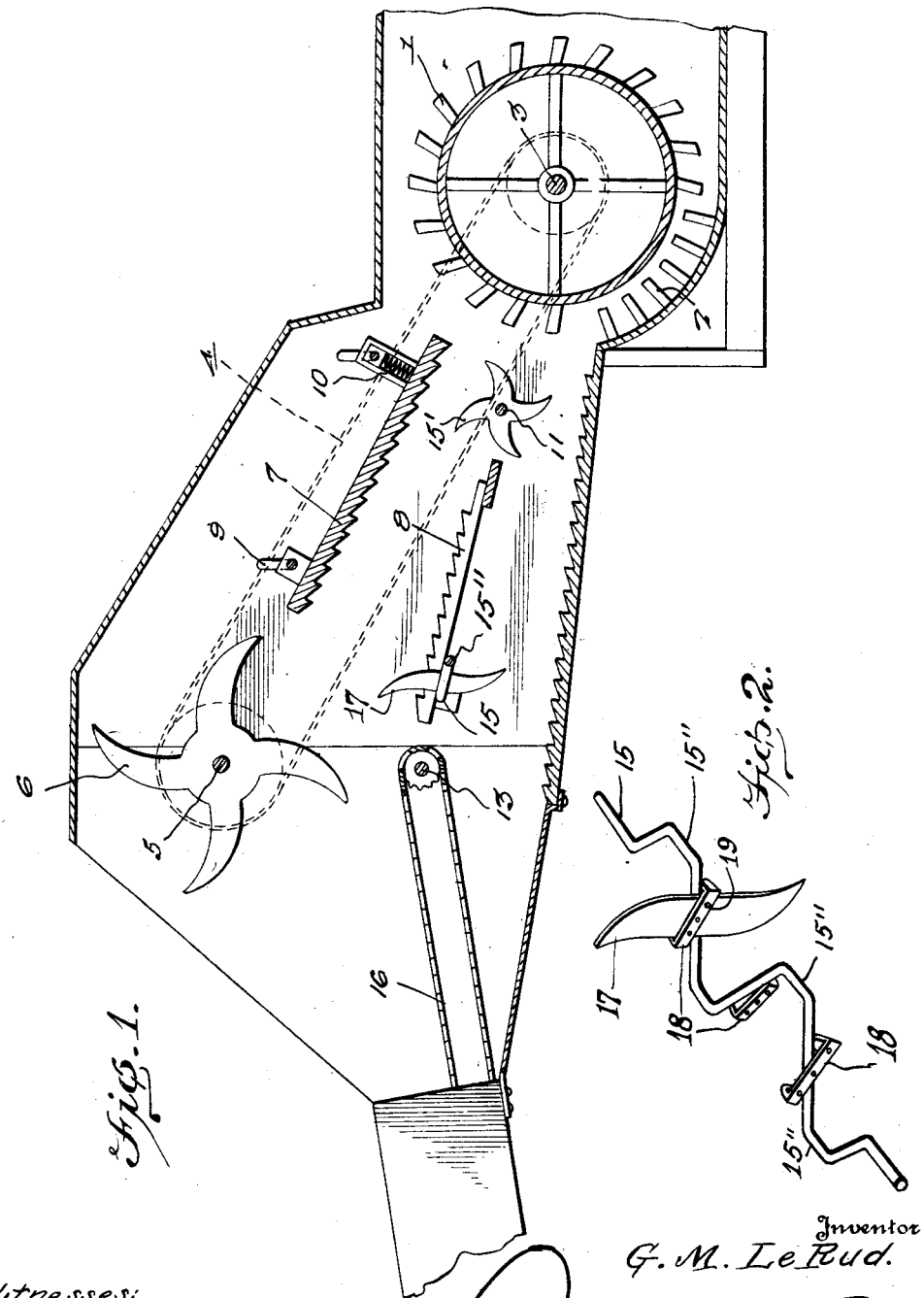

BAND CUTTER.

Application filed July 23, 1923. Serial No. 653,094.

*To all whom it may concern:*

Be it known that GUSTAV M. LE RUD, a citizen of the United States, residing at Argusville, in the county of Cass and State of North Dakota, has invented certain new and useful Improvements in Band Cutters, of which the following is a specification.

This invention has reference to band cutters for use in threshing machines whereby the bundles of grain to be threshed have the bands holding the grain together severed in such manner that the grain bundles are cut apart and distributed to the threshing cylinder so that the top bundles will separate and go down to the cylinder, preventing the straw from jamming, because of the undermounted knives producing a clean cut.

A double crank on the upper feed rakes is used because without it the grain will sometimes work back to the end of the feed rakes and pans and will not go through but work back and forth with the rakes and pans, thus delaying the machine in its operation.

With a sheet iron carrier under the structure put in the right way will stop a lot of spilling of grain, and the chain carrier with oak slats will answer the purpose.

The invention will be best understood from a consideration of the following detailed description taken in connection with the accompanying drawings forming part of this specification with the understanding, however, that the invention is not confined to any strict conformity with the showing in the drawings but may be changed and modified so long as such changes and modifications mark no material departure from the salient features of the invention as expressed in the appended claim.

In the drawings:

Figure 1 is a longitudinal vertical section through the feed end of a threshing machine showing the parts in operative position;

Figure 2 is a perspective view of the band and cutter structures employed in connection with the device.

Referring to the drawings, there is shown a threshing machine cylinder 1 associated with a concave 2 and other parts going therewith, any particular description of the structure not being necessary as it is common to various makes of threshing machines. The cylinder 1 is mounted on a shaft 3 driven by a belt 4 connected to another shaft 5 carrying a circular series of band cutters 6 carried by the shaft 5.

The grain travels between riddles 7 and 8, respectively, with the riddles each provided with supporting links 9 of which certain ones are upheld by springs 10. The belt 4 connects the shafts 3 and 5 while another shaft 11 is operatively connected by any suitable means to the shaft 13 receiving power from the shaft 11 to drive it and the shaft 11 not only drives the shaft 13 but a cutter 15' on the shaft 11.

Straw is fed by a conveyor 16 mounted on the shaft 13 and feeds straw to the riddles 7 and 8. The shaft 15 is formed with cranks 15'' on which are mounted cutter knives 17 fast to brackets 18 in turn made fast by rivets 19 to the crank shaft 15. Several of the cutters 17 are disposed along the crank shaft 15 for simultaneous rotation thereby to cut the fastening bands of the bundles of grain simultaneously and distribute the grain through the machine as it is fed to the cylinder 1. By arranging the cutter knives in undercutting relation to the bundles these knives will give a clear cut and go down to the band, at the same time giving a clear cut thereto.

In that the riddles 8 are mounted upon the crank of the same shaft that carries the knives 17 and the knives are mounted upon the sides of the crank which carries the said riddles as the shaft rotates, the riddles are given longitudinal movement, while the knives are carried around the axis of the shaft. By reason of the fact that the knives are positioned nearer the axis of the shaft than the connecting means between the crank and the riddles, the said knives will impart to the grain a shearing cut as the knives move through the spaces between the riddle bars. The riddle bars will hold the grain against rearward movement, and the shearing action above mentioned, will sever the grain without straining the parts or requiring the expenditure of power which would be necessary in the event that the grain is severed with a chopping action, which is usually resorted to.

What I claim as new is:

In a band cutter, a shaft journalled for rotation and provided at its intermediate portion with a series of cranks which are oppositely disposed with relation to each other guided for longitudinal movement, carrier cleats applied to the converging side portions of the cranks of the shaft and cutting portions of the cranks.

In testimony whereof I affix my signature.

GUST M. LE RUD.